M. C. WRIGHT.
SLEIGH-RUNNERS FOR WHEELED-VEHICLES.

No. 194,208. Patented Aug. 14, 1877.

WITNESSES:
H. Rydquist
J. H. Scarborough

INVENTOR:
M. C. Wright.
BY
ATTORNEYS.

UNITED STATES PATENT OFFICE.

MITCHELL C. WRIGHT, OF CHATHAM, OHIO.

IMPROVEMENT IN SLEIGH-RUNNERS FOR WHEELED VEHICLES.

Specification forming part of Letters Patent No. 194,208, dated August 14, 1877; application filed May 12, 1877.

*To all whom it may concern:*

Figure 1:
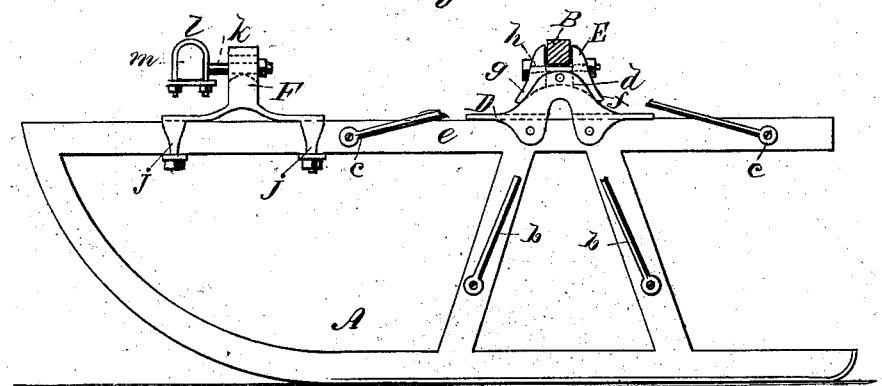
Figure 2:
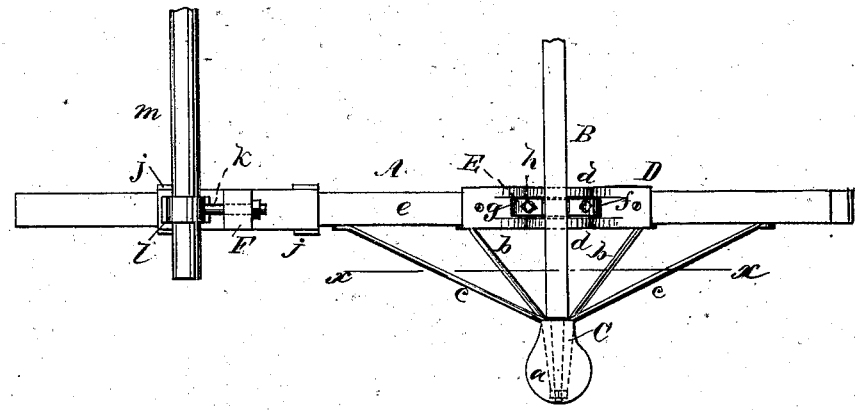

Be it known that I, MITCHELL C. WRIGHT, of Chatham, in the county of Licking and State of Ohio, have invented a new and Improved Sleigh Attachment for Wheeled Vehicles, of which the following is a specification:

Figure 1 is a side elevation, in part section, on line $x\ x$ in Fig. 2. Fig. 2 is a plan view.

Similar letters of reference indicate corresponding parts.

The object of my invention is to provide runners that may be readily applied to the bodies of wheeled vehicles to render them serviceable in winter.

In the drawing, A is a runner of ordinary construction, and B is the axle of the vehicle, to which the runner is attached.

A thimble, C, is fitted to the axle B, that takes the place of the axle-box in the wheel.

Upon the upper side of the thimble C a step, $a$, is formed, and upon its lower side a lug is made, to which braces $b$ and $c$ are bolted. The braces $b$ are fastened to the knees of the runner, and the braces $c$ are bolted to the rave. The runner A is supported by these braces at such a distance from the outer end of the axle as to run in the ordinary sleigh-track, and several holes are made in the lug on the under side of the thimble C, to receive the bolt that retains the several braces, so that the runner may be adjusted.

A casting, D, provided with ears $d$, is bolted to the rave $e$. Between the ears $d$ an axle-support, E, is pivoted, which is composed of two parts, $f\ g$, that are held together and clamped on the axle by a bolt, $h$.

An arm is formed on each part of the support E, for limiting its motion. The thimble C is retained on the axle by the same nut that retains the wheels.

A post, F, is secured to the rave $e$ by clips $j$, and is slotted to receive the shank $k$ of the clip $l$, which clip embraces the thill-bar $m$. The shank $k$ is threaded, and is provided with a nut that retains it in the post F.

The runners A are oppositely arranged for opposite sides of the vehicle. The front runners only need be provided with posts F. The runner is readily applied to or detached from the axle, and when applied converts the vehicle into a complete sleigh. The runners are capable of independent motion, and the peculiar method of attaching the thills permits them to move freely.

Having thus described my invention, I claim as new and desire to secure by Letters Patent—

1. The support E, composed of the parts $f\ g$ and bolt $h$, and the casting D, having ears $d$, in combination, substantially as and for the purpose shown and described.

2. The combination of the post F, having bottom clip-arms $j$ and a slotted top, and the bolt $k$, having a clip, $l$, with the sleigh-rave $e$, runner A, and the thill-bar $m$, as and for the purpose set forth.

MITCHELL C. WRIGHT.

Witnesses:
 NEWTON WYETH,
 FRANKLIN SEVERE.